(12) United States Patent
Hikita et al.

(10) Patent No.: US 11,104,185 B2
(45) Date of Patent: Aug. 31, 2021

(54) METHOD OF MANUFACTURING MOTORCYCLE TIRE FOR UNEVEN TERRAIN TRAVEL

(71) Applicant: SUMITOMO RUBBER INDUSTRIES, LTD., Hyogo (JP)

(72) Inventors: Masahiro Hikita, Hyogo (JP); Shizuya Aoki, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 398 days.

(21) Appl. No.: 15/981,908

(22) Filed: May 17, 2018

(65) Prior Publication Data
US 2019/0039417 A1 Feb. 7, 2019

(30) Foreign Application Priority Data
Aug. 3, 2017 (JP) .............................. JP2017-150921

(51) Int. Cl.
*B60C 11/11* (2006.01)
*B29D 30/16* (2006.01)
(Continued)

(52) U.S. Cl.
CPC .............. *B60C 11/11* (2013.01); *B29D 30/16* (2013.01); *B60C 11/1376* (2013.01);
(Continued)

(58) Field of Classification Search
CPC .... B29D 30/16; B29D 30/00; B60C 2200/10; B60C 2009/2012; B60C 2009/2025; B60C 15/0018
See application file for complete search history.

(56) References Cited

U.S. PATENT DOCUMENTS 4,393,912 A * 7/1983 Gouttebessis .......... B29D 30/00
152/452
4,614,215 A * 9/1986 Osawa ...................... B60C 3/04
152/527
(Continued)

FOREIGN PATENT DOCUMENTS

CN 1126140 7/1996
CN 1319053 10/2001
(Continued)

OTHER PUBLICATIONS

"Office Action of China Counterpart Application", dated Jun. 16, 2021, with English translation therof, p. 1-p. 14.

*Primary Examiner* — Jacob T Minskey
*Assistant Examiner* — Virak Nguon
(74) *Attorney, Agent, or Firm* — JCIPRNET

(57) ABSTRACT

The disclosure provides a method of manufacturing a motorcycle tire for uneven terrain travel in which both a rigid feeling at the time of driving and a shock absorbing ability are able to be achieved. Provided is a method of manufacturing a motorcycle tire for uneven terrain travel including a process of molding a green tire including a tread portion, a pair of sidewall portions and a pair of bead portions, and a vulcanization process of vulcanizing the green tire using a mold. In the mold, a clip width, which is a distance in a tire axial direction between a pair of bead molding surfaces which form outer surfaces of the pair of bead portions, is 100% to 110% of a rim width of a normal rim to which a completed motorcycle tire is attached.

19 Claims, 4 Drawing Sheets

(51) Int. Cl.
*B60C 11/13* (2006.01)
*B60C 11/03* (2006.01)

(52) U.S. Cl.
CPC ......... *B60C 11/1392* (2013.01); *B60C 11/032* (2013.01); *B60C 2200/10* (2013.01); *B60C 2200/14* (2013.01)

(56) References Cited

U.S. PATENT DOCUMENTS

| | | | |
|---|---|---|---|
| 6,250,352 B1* | 6/2001 | Ishikawa | B60C 3/00 152/209.11 |
| 6,648,040 B1* | 11/2003 | Funahara | B60C 9/20 152/209.11 |
| 2003/0173013 A1* | 9/2003 | Idei | B60C 9/06 152/531 |
| 2013/0284333 A1* | 10/2013 | Ishida | B60C 11/12 152/209.18 |
| 2018/0134100 A1* | 5/2018 | Kawaguchi | B60C 9/08 |
| 2019/0322139 A1* | 10/2019 | Tokitoh | B60C 15/04 |

FOREIGN PATENT DOCUMENTS

| | | |
|---|---|---|
| CN | 2006199084 | 8/2006 |
| CN | 101306580 | 11/2008 |
| CN | 102343769 | 2/2012 |
| JP | H04321403 | 11/1992 |
| JP | 4583944 B2 * | 11/2010 |
| JP | 5174142 | 4/2013 |

* cited by examiner

METHOD OF MANUFACTURING MOTORCYCLE TIRE FOR UNEVEN TERRAIN TRAVEL

CROSS-REFERENCE TO RELATED APPLICATION

This application claims the priority benefit of Japan application serial no. 2017-150921, filed on Aug. 3, 2017. The entirety of the above-mentioned patent application is hereby incorporated by reference herein and made a part of this specification.

BACKGROUND

Technical Field

The disclosure relates to a method of manufacturing a motorcycle tire for uneven terrain travel.

Description of Related Art

Conventionally, various motorcycle tires for uneven terrain travel have been proposed (for example, Patent Document 1: Japanese Laid-open No. 5174142). A vehicle to which the tire is attached may sometimes spring up greatly from the road surface during traveling on uneven terrain or motocross competition. For this reason, the tire has been designed both to cause a rigid feeling at the time of driving and have a shock absorbing ability at the time of landing after a jump.

However, when a rigidity of a tread portion is moderated in order to enhance the shock absorbing ability, a rigidity of a sidewall portion is also moderated, and thus a rigid feeling at the time of driving tends to be impaired.

SUMMARY

An embodiment of the disclosure provides a method of manufacturing a motorcycle tire for uneven terrain travel and includes a process of molding a green tire including a tread portion, a pair of sidewall portions, and a pair of bead portions, and a vulcanization process of vulcanizing the green tire using a mold, wherein, in the mold, a clip width, which is a distance in a tire axial direction between a pair of bead molding surfaces which form outer surfaces of the pair of bead portions, is 100% to 110% of a rim width of a normal rim to which a completed motorcycle tire is attached.

DESCRIPTION OF THE EMBODIMENTS

Figure 1:
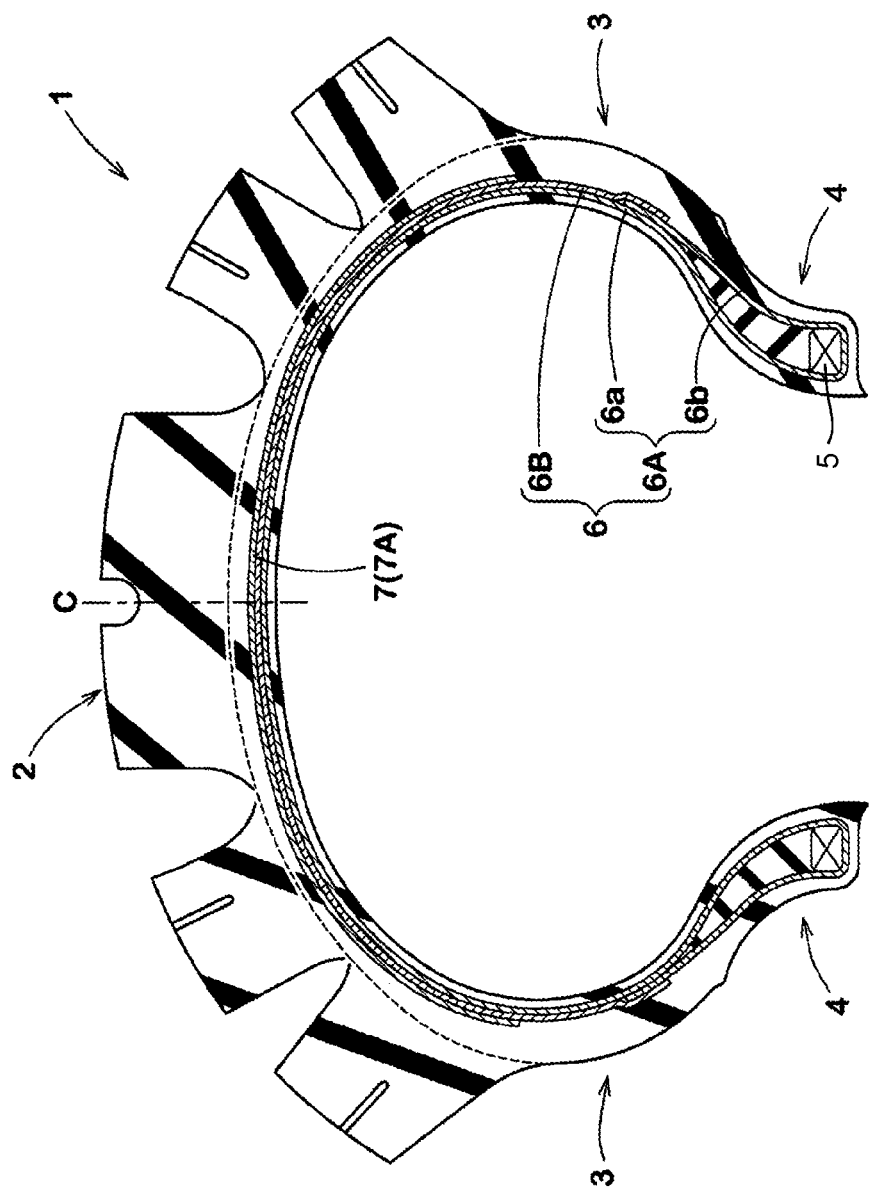
FIG. 1 is a cross-sectional view of a motorcycle tire for uneven terrain travel manufactured by a manufacturing method of the present embodiment.

The embodiments of the disclosure provide a method of manufacturing a motorcycle tire for uneven terrain travel in which both a rigid feeling at the time of driving and a shock absorbing ability are able to be achieved.

In the method of manufacturing a motorcycle tire for uneven terrain travel of one or some exemplary embodiments of the disclosure, in the mold, a maximum outer diameter of a tread molding surface which molds the tread portion is 99.5% to 110% of an outer diameter of a tire in a normal state in which the tire is rim-assembled onto a normal rim, filled to a normal internal pressure, and has no load thereon.

In the method of manufacturing a motorcycle tire for uneven terrain travel of one or some exemplary embodiments of the disclosure, in the mold, a width in the tire axial direction of the tread molding surface which molds the tread portion is 100% to 110% of a tread width in a normal state in which a completed motorcycle tire is rim-assembled onto a normal rim, filled to a normal internal pressure, and has no load thereon.

In the method of manufacturing a motorcycle tire for uneven terrain travel of one or some exemplary embodiments of the disclosure, the green tire include a carcass extending from the tread portion to the bead portion via the sidewall portion, the carcass include a first carcass ply formed of an array of a carcass cords and having a main body portion extending from the tread portion to a bead core of the bead portion via the sidewall portion and a folded-back portion continuous with the main body portion and folded back around the bead core from an inner side toward an outer side in the tire axial direction, and, in the vulcanization process, the carcass cords of the folded-back portion be inclined at an angle larger than that of the carcass cords of the main body portion with respect to a tire circumferential direction.

In the method of manufacturing a motorcycle tire for uneven terrain travel of one or some exemplary embodiments of the disclosure, in the vulcanization process, the carcass cords of the main body portion are inclined at an angle of 27° to 45° with respect to the tire circumferential direction.

In the method of manufacturing a motorcycle tire for uneven terrain travel of one or some exemplary embodiments of the disclosure, in the vulcanization process, the carcass cords of the folded-back portion are inclined at an angle of 41° to 50° with respect to the tire circumferential direction.

In the method of manufacturing a motorcycle tire for uneven terrain travel of one or some exemplary embodiments of the disclosure, the carcass include a second carcass ply formed of an array of carcass cords arranged on an outer side in a tire radial direction of the main body portion, and, in the vulcanization process, a ratio $\theta1/\theta2$ of an angle $\theta1$ of the carcass cords of the main body portion with respect to the tire circumferential direction to an angle $\theta2$ of the carcass cords of the second carcass ply with respect to the tire circumferential direction be set to 1.05 to 1.15.

In the method of manufacturing a motorcycle tire for uneven terrain travel of one or some exemplary embodiments of the disclosure, the tread portion include a crown region which is a region of ⅓ of a tread planar width centered on a tire equator and a plurality of crown blocks arranged in the crown region, and, in the vulcanization process, a sum of lengths of each of the crown blocks in the tire circumferential direction be 0.20 to 0.30 times the tire outer circumferential length at the tire equator.

In the method of manufacturing a motorcycle tire for uneven terrain travel of one or some exemplary embodiments of the disclosure, a length in the tire circumferential direction of the crown block is 0.40 to 0.60 times a length in the tire axial direction of the crown block.

A method of manufacturing a motorcycle tire for uneven terrain travel of the embodiments of the disclosure includes a process of molding a green tire and a vulcanization process of vulcanizing the green tire using a mold. Also, in the embodiments of the disclosure, in the mold, a clip width, which is a distance in a tire axial direction between a pair of bead molding surfaces which form outer surfaces of the pair of bead portions, is 100% to 110% of a rim width of a normal rim to which a completed motorcycle tire is attached. In the tire obtained by such a manufacturing method, a difference between a profile of a molding surface of the mold and a profile of the tire after being filled to an internal pressure is small. Therefore, when the internal pressure is applied, tension acts uniformly on the entire carcass. As a result, the tire realizes constant bending irrespective of a magnitude of a load and can exhibit an excellent rigid feeling at the time of driving and an excellent shock absorbing ability.

Hereinafter, embodiments of the disclosure will be described on the basis of the accompanying drawings. FIG. 1 is a cross-sectional view illustrating a motorcycle tire 1 for uneven terrain travel (hereinafter, sometimes simply referred to as a "tire") manufactured by a manufacturing method of the present embodiment. More specifically, FIG. 1 is a meridional cross-sectional view including a tire rotation axis in a normal state of a rear wheel tire for motocross competition.

The normal state refers to a state in which a tire is rim-assembled onto a normal rim, filled to a normal internal pressure, and furthermore, has no load thereon. In the specification, unless otherwise specified, dimensions and the like of each portion of the tire are values measured in the normal state.

The "normal rim" is a rim defined by standards established for each tire size in standard systems including a standard on which the tire is based, for example, the "Standard Rim" of the Japan Automobile Tire Manufacturers Association (JATMA), the "Design Rim" of the Tire and Rim Association (TRA), or the "Measuring Rim" of the European Tire and Rim Technical Organization (ETRTO).

The "normal internal pressure" is an air pressure defined by standards established for each tire size in a standard system including a standard on which the tire is based, for example, the "maximum air pressure" of the JATMA, a maximum value described in the table "TIRE LOAD LIMITS AT VARIOUS COLD INFLATION PRESSURES" of the TRA, or the "INFLATION PRESSURE" of the ETRTO.

As illustrated in FIG. 1, the tire 1 includes a tread portion 2, a pair of sidewall portions 3, and a pair of bead portions 4. An outer surface of the tread portion 2 is curved to protrude outwards in a tire radial direction. The sidewall portions 3 extend from opposite sides in a tire axial direction of the tread portion 2 toward an inner side in the tire radial direction. The bead portions 4 are respectively continuous with the inner side in the tire radial direction of the sidewall portions 3.

A method of manufacturing the motorcycle tire 1 for uneven terrain travel of the embodiments of the disclosure (hereinafter sometimes simply referred to as a "manufacturing method") includes a green tire molding process of molding a green tire and a vulcanization process of vulcanizing a green tire using a mold. For the manufacturing method of the embodiments of the disclosure, known matters are applied, which are not specifically described.

Figure 2:
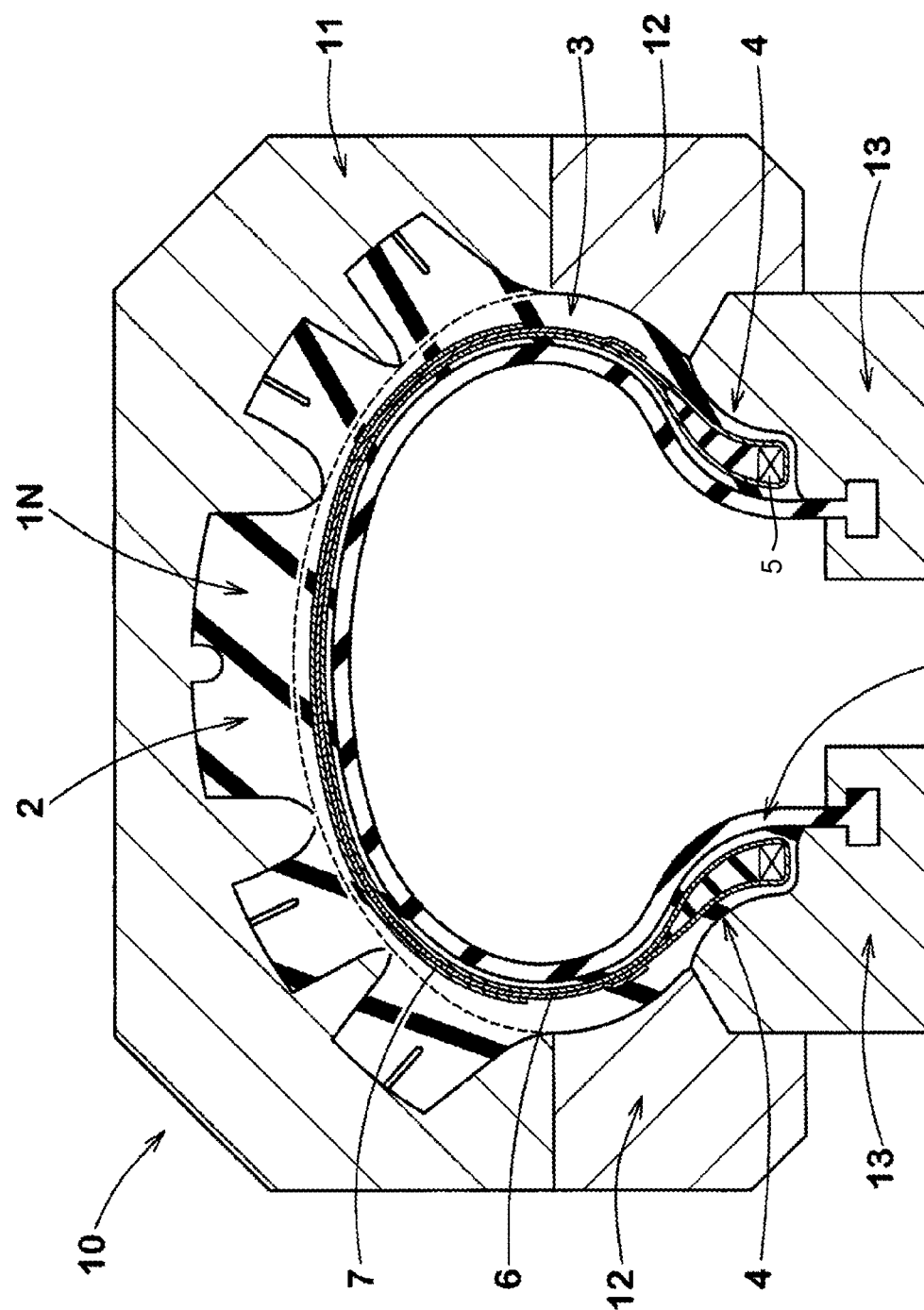
FIG. 2 is a cross-sectional view of a mold and a green tire in a vulcanization process.

FIG. 2 is a cross-sectional view illustrating a mold 10 and a green tire 1N in the vulcanization process. As illustrated in FIG. 2, the green tire 1N includes the tread portion 2, the pair of sidewall portions 3, and the pair of bead portions 4. In addition, the green tire 1N includes a carcass 6 and a belt layer 7. For example, the carcass 6 extends from the tread portion 2 to bead cores 5 of the bead portions 4 via the sidewall portions 3. The belt layer 7 is arranged inside the tread portion 2 and on an outer side in the tire radial direction of the carcass 6.

The mold 10 includes, for example, a tread segment 11, a sidewall ring 12, and a bead ring 13. The tread segment 11 forms an outer surface of the tread portion 2. The sidewall ring 12 forms an outer surface of the sidewall portion 3. The bead ring 13 forms an outer surface of the bead portion 4. In the vulcanization process, the green tire 1N is vulcanization-molded between the mold 10 and a vulcanization bladder 14, and thus the tire 1 can be obtained.

Figure 3:
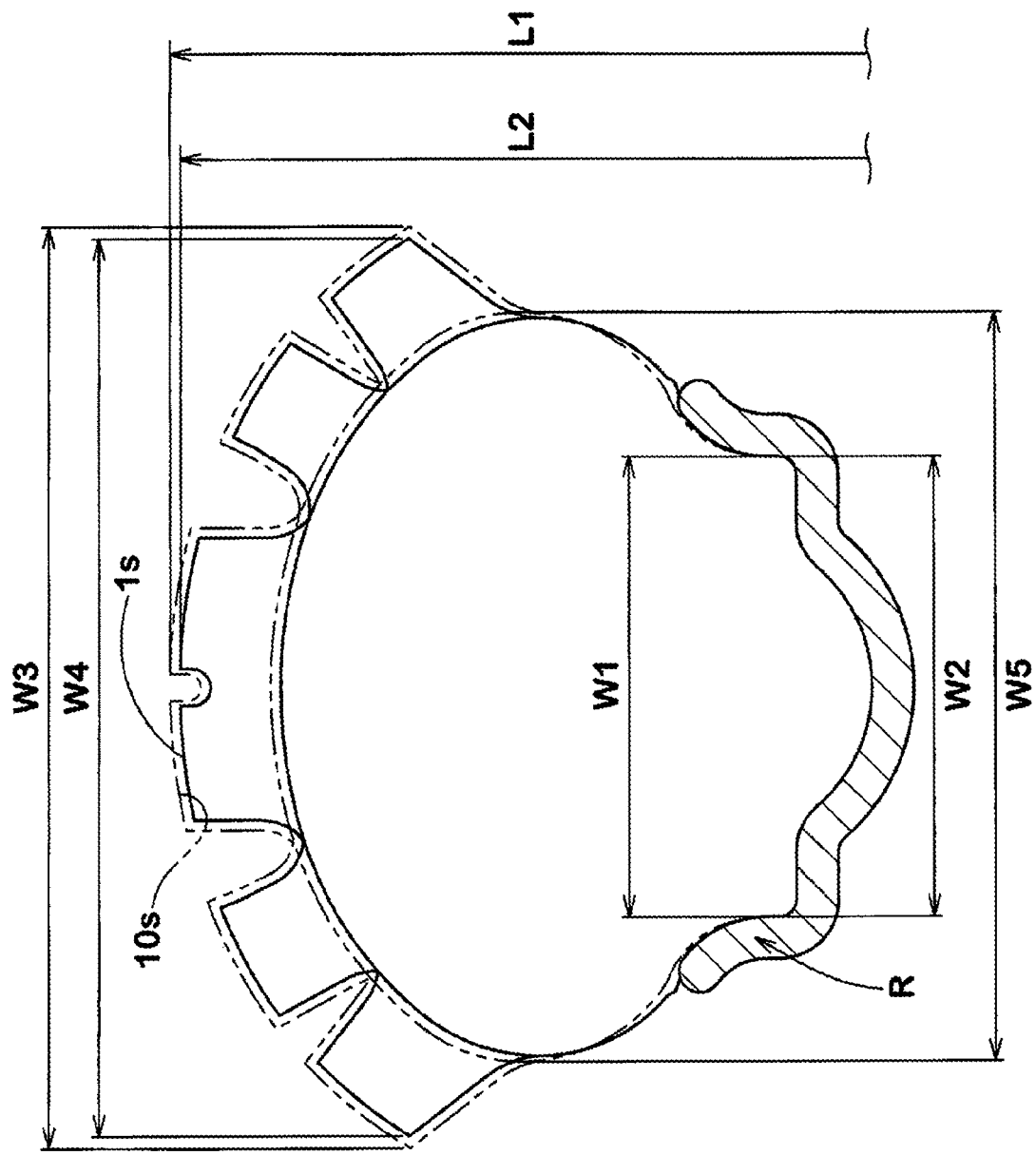
FIG. 3 is a profile of a molding surface of a mold and a profile of an outer surface of a tire.

FIG. 3 illustrates a profile of a molding surface $10s$ of the mold 10 and a profile of an outer surface $1s$ of the tire 1 in the normal state in the manufacturing method of the present embodiment. In FIG. 3, the profile of the molding surface $10s$ of the mold 10 is illustrated by a double-dotted-dashed line. The profile of the outer surface is of the tire 1 is illustrated by a solid line. As illustrated in FIG. 3, in the manufacturing method of the present embodiment, in the mold 10, a clip width W2 is set to be 100% to 110% of a rim width W1 of a normal rim R, which is smaller than that in conventional cases. The clip width W2 of the mold 10 is a distance in the tire axial direction between a pair of bead molding surfaces that form the outer surfaces of the pair of bead portions 4.

In a conventional manufacturing method of the motorcycle tire 1 for uneven terrain travel, the clip width W2 with respect to the rim width W1 tends to be set to be larger than the range described above. Therefore, in a tire obtained by such a conventional manufacturing method, when the tire is rim-assembled, bead portions and sidewall portions tend to bend toward inner sides in the tire axial direction. When an internal pressure is applied in this state, while a carcass disposed in a tread portion is subjected to high tension, a carcass disposed in the sidewall portions and the bead portions is subjected to hardly any tension. For this reason, in the tire obtained by a conventional manufacturing method, a distribution of tension on the carcass is not uniform and there is a tendency that a rigid feeling at the time of driving and a shock absorbing ability are not readily compatible.

In contrast, in the tire 1 obtained by the manufacturing method of the present embodiment, since a distance between the outer surfaces of the bead portions 4 is similar to the rim width W1 of the normal rim R, the sidewall portions 3 and the bead portions 4 are hardly deformed when the tire is rim-assembled. Therefore, in the tire 1, a difference between the profile of the molding surface $10s$ of the mold 10 and a profile of the tire 1 after an internal pressure is applied is small. Therefore, when an internal pressure is applied, the tension acts uniformly on the entire carcass 6. As a result, in the tire, constant bending irrespective of a magnitude of a load can be realized and an excellent rigid feeling at the time of driving and a shock absorbing ability can be exhibited.

From the same perspective, in the mold 10, a maximum outer diameter L1 of a tread molding surface for molding the tread portion 2 is, for example, 99.5% to 110% of an outer diameter L2 of the tire in the normal state described above. Also, in order to obtain such a relationship between the maximum outer diameter of the tread molding surface $10s$ and the outer diameter of the tire, the maximum outer diameter L1 of the tread molding surface is set to, for example, 100% to 105% of a design dimension of the tire outer diameter defined by standards established for each tire size in a standard system including the standard on which the tire is based.

In the mold 10, a width W3 in the tire axial direction of the tread molding surface for forming the tread portion 2 is, for example, 100% to 110% of a tread width W4 in the above-described normal state of the completed motorcycle tire. Further, in order to obtain such a relationship between the width of the tread molding surface and the tread width of the tire, a side wall width W5, which is a distance in the tire axial direction between the pair of side wall molding surfaces 10b forming the outer surfaces of the pair of sidewall portions 3, is set to, for example, 100% to 105% of a design dimension of the cross-sectional width of the tire defined by standards established for each tire size in a standard system including a standard on which the tire is based.

As illustrated in FIG. 1, the carcass 6 includes one or a plurality of carcass plies formed of an array of carcass cords. As an example, the carcass 6 of the present embodiment is constituted by, for example, a first carcass ply 6A and a second carcass ply 6B.

The first carcass ply 6A includes, for example, a main body portion 6a and a folded-back portion 6b. The main body portion 6a extends from the tread portion 2 to bead cores 5 of the bead portions 4 via the sidewall portions 3. For example, the folded-back portion 6b is continuous with the main body portion 6a and is folded back around each of the bead cores 5 from the inside toward the outside in the tire axial direction.

In a state before vulcanization, the carcass cords of the main body portion 6a are arranged, for example, at an angle θ3 of 30° to 35° with respect to a tire circumferential direction. Also, the angle θ3 is measured, for example, on a tire equator. The carcass cords of the folded-back portion 6b are arranged, for example, at an angle θ4 of 42° to 47° with respect to the tire circumferential direction. Further, the angle θ4 is measured, for example, at a lower portion of the bead, for example, at a portion adjacent to the bead core in the tire axial direction. Further, the angle θ4 of the folded-back portion 6b is, for example, larger than the angle θ3 of the main body portion 6a. A difference between the angle θ4 of the folded-back portion 6b and the angle θ3 of the main body portion 6a is, for example, 12° to 15°. Through such an arrangement of the carcass cords, the relationship between the profile of the mold and the profile of the tire described above can be obtained.

In the tread portion 2, the second carcass ply 6B is arranged, for example, on an outer side in the tire radial direction of the main body portion 6a of the first carcass ply 6A. For example, the second carcass ply 6B extends from the tread portion 2 to the bead portions 4 via the sidewall portions 3. For example, in each of the bead portions 4, the second carcass ply 6B is arranged on an outer side in the tire axial direction of the folded-back portion 6b of the first carcass ply 6A and terminates without being folded back. The second carcass ply 6B prevents exclusive expansion of the tread portion 2 when internal pressure is applied, and furthermore, helps tension act on the entire carcass 6.

For example, the second carcass ply 6B has carcass cords inclined in a direction opposite to the carcass cords of the main body portion 6a of the first carcass ply 6A with respect to the tire circumferential direction. Thereby, the tread portion 2 is effectively reinforced. Therefore, excessive expansion only in the tread portion 2 as in the conventional manufacturing method does not occur, and tension acts on the entire carcass 6. In a state before vulcanization, the carcass cords of the second carcass ply 6B are arranged, for example, at an angle θ5 of 32° to 40° with respect to the tire circumferential direction.

The belt layer 7 is arranged, for example, inside the tread portion 2 and on an outer side in the tire radial direction of the carcass 6. The belt layer 7 is constituted by a single belt ply 7A, for example. The belt ply 7A is constituted by, for example, an array of belt cords arranged to be inclined with respect to the tire circumferential direction. For example, the belt cords are arranged at an angle of 15° to 40° with respect to the tire circumferential direction.

In the vulcanization process, the carcass cords of the folded-back portion 6b are, for example, inclined at an angle larger than that of the carcass cords of the main body portion 6a with respect to the tire circumferential direction. As a result, when internal pressure is applied, since tension appropriately acts on the main body portion 6a, an excellent rigid feeling at the time of driving can be obtained.

In order to enhance a rigid feeling at the time of driving and a shock absorbing ability in a well-balanced manner, in the vulcanization process, for example, the carcass cords of the main body portion 6a are inclined at an angle θ1 of 27° to 45° with respect to the tire circumferential direction. In another example, the angle θ1 is 28° to 33°. In addition, in the vulcanization process, for example, the carcass cords of the folded-back portion 6b are inclined at an angle θ6 of 41° to 50° with respect to the tire circumferential direction. In another example, the angle θ6 is 42° to 47°.

In the vulcanization press, a ratio θ1/θ2 of the angle θ1 of the carcass cords of the main body portion 6a with respect to the tire circumferential direction to the angle θ2 of the carcass cords of the second carcass ply 6B with respect to the tire circumferential direction is, for example, set to 1.05 to 1.15. Thereby, the tread portion 2 is reinforced in a well-balanced manner, and can exhibit an excellent rigid feeling at the time of driving and a shock absorbing ability.

Further, this configuration of each of the carcass cords in the vulcanization process can be obtained, for example, by setting the angle of the carcass cords of each portion at the time of the green tire before vulcanization as described above.

Figure 4:
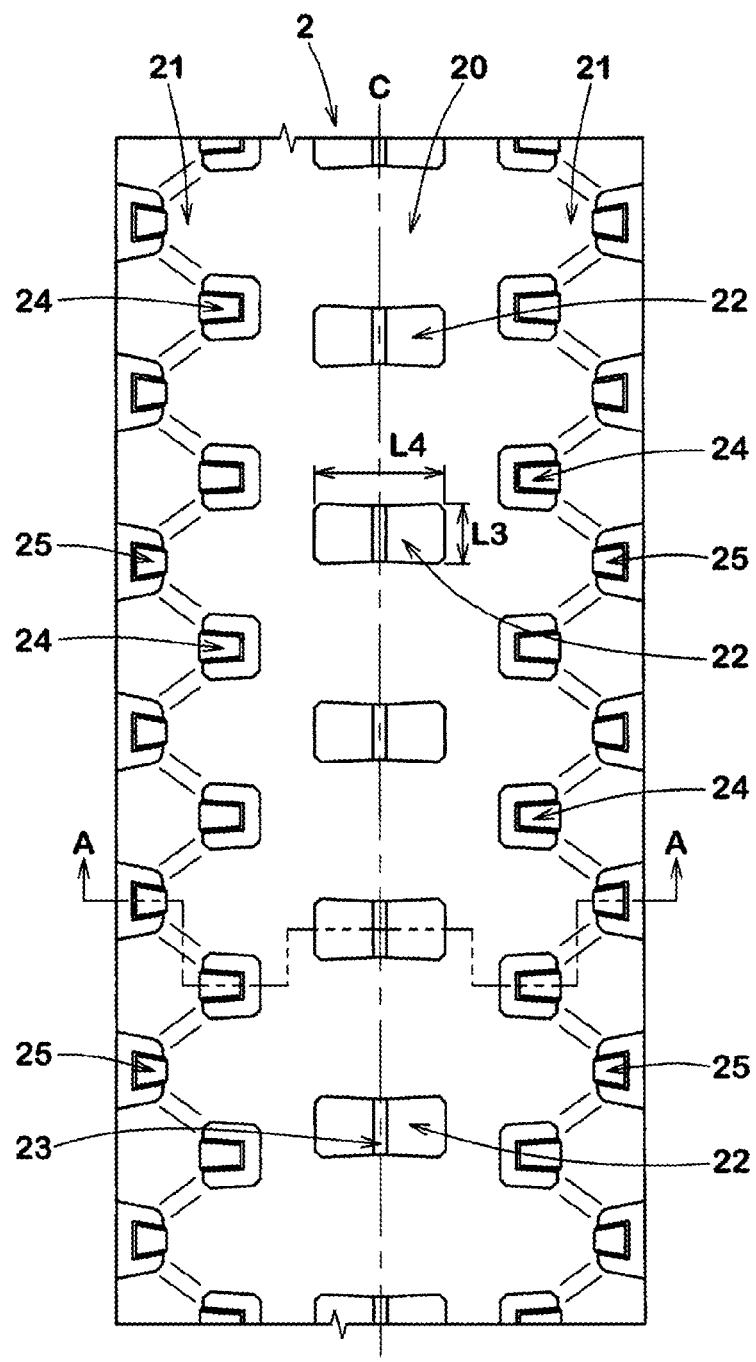
FIG. 4 is a planar figure of a tread portion after the vulcanization process.

FIG. 4 is a planar figure illustrating the tread portion 2 after the vulcanization process. FIG. 1 corresponds to a cross-sectional view taken along line A-A of FIG. 4. As illustrated in FIG. 4, the tread portion 2 includes, for example, a crown region 20 and a pair of middle/shoulder regions 21. The crown region 20 is a region of ⅓ of a tread planar width centered on a tire equator C. The middle/shoulder regions 21 are respectively provided on one side and the other side in the tire axial direction of the crown region 20.

In the crown region 20, for example, a plurality of crown blocks 22 are provided in the tire circumferential direction. For example, each of the crown blocks 22 has a shape which is longest in the tire axial direction. In the crown block 22 of the present embodiment, for example, a slot 23 which traverses the block at a central portion in the tire circumferential direction is provided. Thereby, the crown block 22 has two rectangular tread surfaces.

A length L3 of the crown block 22 in the tire circumferential direction is, for example, 0.40 times a length L4 of the crown block 22 in the tire axial direction or more, or 0.45 times or more, and is, for example, 0.60 times the length L4 of the crown block 22 in the tire axial direction or less, or 0.55 times or less.

In addition, in the vulcanization process of the present embodiment, a sum Lb of the length L3 of each of the crown blocks 22 in the tire circumferential direction is, for example, 0.20 to 0.30 times a tire outer circumferential length Lt at the tire equator C. Thereby, the tread portion 2 is appropriately reinforced, and a rigid feeling at the time of driving is effectively enhanced while a shock absorbing ability is maintained.

In the middle/shoulder regions 21, for example, a plurality of middle blocks 24 and a plurality of shoulder blocks 25 are provided. The shoulder blocks 25 are provided outwards from the middle blocks 24 in the tire axial direction, for example. In some exemplary embodiments, the middle blocks 24 and the shoulder blocks 25 are alternately provided in the tire circumferential direction in one of the middle/shoulder regions 21.

Although one embodiment of the manufacturing method of the disclosure has been described above in detail, the disclosure is not limited to the specific embodiment described above, and may be implemented with various modifications.

Examples

A rear wheel tire of size 120/80-19 for motocross having the basic structure of FIG. 1 was manufactured as a prototype by the manufacturing method described above. Further, as comparative example 1, a test tire was manufactured as a prototype by a manufacturing method in which the clip width W2 was 137% of the rim width of a normal rim. Each test tire was tested for a rigid feeling at the time of driving and a shock absorbing ability. Common specifications or test methods for each test tire were as follows.

Used vehicle: Motocross competition vehicle of 450 cc displacement

Rim size: 2.15×19

Internal pressure: 80 kPa

<Rigid Feeling at the Time of Driving and Shock Absorption Ability>

A rigid feeling at the time of driving and a shock absorbing ability were sensorily evaluated by test riders when traveling on a motocross course with the above test vehicles. The results are shown by scores with that for Comparative example 1 being taken as 100, and a larger numerical value indicating a better rigid feeling at the time of driving or a better shock absorbing ability. The test results are shown in Table 1.

TABLE 1

|  | Comparative example 1 | Example 1 | Comparative example 2 | Example 2 | Example 3 | Example 4 | Example 5 | Comparative example 3 |
|---|---|---|---|---|---|---|---|---|
| Clip width W2 of mold/rim width W1 (%) | 137 | 105 | 95 | 100 | 103 | 107 | 110 | 115 |
| Maximum outer diameter L1 of tread molding surface/outer diameter L2 of tire | 98 | 100 | 100 | 100 | 100 | 100 | 100 | 100 |
| Width W3 of tread molding surface/tread width W4 of tire | 113 | 105 | 98 | 101 | 104 | 106 | 109 | 113 |
| Angle θ1 (°) of cord of main body portion after vulcanization | 33 | 33 | 33 | 33 | 33 | 33 | 33 | 33 |
| Angle θ6 (°) of cord of folded-back portion after vulcanization | 55 | 45 | 45 | 45 | 45 | 45 | 45 | 45 |
| Angle θ1 of cord of main body portion/angle θ2 of cord of second carcass ply | 1.00 | 1.10 | 1.10 | 1.10 | 1.10 | 1.10 | 1.10 | 1.10 |
| Sum Lb of lengths of Cr blocks in tire circumferential direction/tire outer circumferential length Lt | 0.36 | 0.25 | 0.25 | 0.25 | 0.25 | 0.25 | 0.25 | 0.25 |
| Length L3 of Cr block in tire circumferential direction/length L4 of Cr block in tire axial direction | 0.45 | 0.50 | 0.50 | 0.50 | 0.50 | 0.50 | 0.50 | 0.50 |
| Rigid feeling at time of driving (score) | 100 | 120 | 106 | 114 | 116 | 117 | 115 | 107 |
| Shock absorbing ability (score) | 100 | 120 | 108 | 116 | 118 | 117 | 114 | 106 |

|  | Example 6 | Example 7 | Example 8 | Example 9 | Example 10 | Example 11 | Example 12 | Example 13 |
|---|---|---|---|---|---|---|---|---|
| Clip width W2 of mold/rim width W1 (%) | 105 | 105 | 105 | 105 | 105 | 105 | 105 | 105 |
| Maximum outer diameter L1 of tread molding surface/outer diameter L2 of tire | 98 | 99.5 | 105 | 110 | 100 | 100 | 100 | 100 |
| Width W3 of tread molding surface/tread width W4 of tire | 100 | 100 | 100 | 100 | 100 | 100 | 100 | 100 |

TABLE 1-continued

| | | | | | | | | |
|---|---|---|---|---|---|---|---|---|
| Angle θ1 (°) of cord of main body portion after vulcanization | 33 | 33 | 33 | 33 | 27 | 28 | 35 | 45 |
| Angle θ6 (°) of cord of folded-back portion after vulcanization | 45 | 45 | 45 | 45 | 41 | 42 | 47 | 50 |
| Angle θ1 of cord of main body portion/angle θ2 of cord of second carcass ply | 1.10 | 1.10 | 1.10 | 1.10 | 1.10 | 1.10 | 1.10 | 1.10 |
| Sum Lb of lengths of Cr blocks in tire circumferential direction/tire outer circumferential length Lt | 0.25 | 0.25 | 0.25 | 0.25 | 0.25 | 0.25 | 0.25 | 0.25 |
| Length L3 of Cr block in tire circumferential direction/length L4 of Cr block in tire axial direction | 0.50 | 0.50 | 0.50 | 0.50 | 0.50 | 0.50 | 0.50 | 0.50 |
| Rigid feeling at time of driving (score) | 113 | 115 | 114 | 114 | 117 | 118 | 117 | 114 |
| Shock absorbing ability (score) | 112 | 116 | 115 | 113 | 114 | 117 | 119 | 116 |

| | Example 14 | Example 15 | Example 16 | Example 17 | Example 18 | Example 19 | Example 20 | Example 21 |
|---|---|---|---|---|---|---|---|---|
| Clip width W2 of mold/rim width W1 (%) | 105 | 105 | 105 | 105 | 105 | 105 | 105 | 105 |
| Maximum outer diameter L1 of tread molding surface/outer diameter L2 of tire | 100 | 100 | 100 | 100 | 100 | 100 | 100 | 100 |
| Width W3 of tread molding surface/tread width W4 of tire | 105 | 105 | 105 | 105 | 105 | 105 | 100 | 100 |
| Angle θ1 (°) of cord of main body portion after vulcanization | 33 | 33 | 33 | 33 | 33 | 33 | 33 | 33 |
| Angle θ6 (°) of cord of folded-back portion after vulcanization | 45 | 45 | 45 | 45 | 45 | 45 | 45 | 45 |
| Angle θ1 of cord of main body portion/angle θ2 of cord of second carcass ply | 1.05 | 1.08 | 1.12 | 1.15 | 1.10 | 1.10 | 1.10 | 1.10 |
| Sum Lb of lengths of Cr blocks in tire circumferential direction/tire outer circumferential length Lt | 0.25 | 0.25 | 0.25 | 0.25 | 0.20 | 0.23 | 0.27 | 0.30 |
| Length L3 of Cr block in tire circumferential direction/length L4 of Cr block in tire axial direction | 0.50 | 0.50 | 0.50 | 0.50 | 0.40 | 0.43 | 0.47 | 0.60 |
| Rigid feeling at time of driving (score) | 113 | 117 | 120 | 122 | 113 | 117 | 120 | 121 |
| Shock absorbing ability (score) | 120 | 120 | 116 | 111 | 120 | 120 | 116 | 112 |

The result of the tests was that it could be confirmed that the tire of the Examples exhibited an excellent rigidity feeling at the time of driving and an excellent shock absorbing ability.

What is claimed is:

1. A method of manufacturing a motorcycle tire for uneven terrain travel comprising:
    a process of molding a green tire including a tread portion, a pair of sidewall portions, and a pair of bead portions; and
    a vulcanization process of vulcanizing the green tire using a mold, wherein,
    in the mold, a clip width, which is a distance in a tire axial direction between a pair of bead molding surfaces which form outer surfaces of the pair of bead portions, is 100% to 105% of a rim width of a normal rim to which a completed motorcycle tire is attached, and
    wherein a tread molding surface in the mold, which molds the tread portion of the motorcycle tire, has a maximum outer diameter that is 99.5% to 110% of an outer diameter of a tire in a normal state in which the tire is rim-assembled onto the normal rim, filled to a normal internal pressure, and has no load thereon.

2. The method of manufacturing a motorcycle tire for uneven terrain travel according to claim 1, wherein, in the mold, a width in the tire axial direction of the tread molding surface which molds the tread portion is 100% to 110% of a tread width in a normal state in which a completed motorcycle tire is rim-assembled onto the normal rim, filled to a normal internal pressure, and has no load thereon.

3. The method of manufacturing a motorcycle tire for uneven terrain travel according to claim 2, wherein
the green tire includes a carcass extending from the tread portion to the bead portion via the sidewall portion,
the carcass includes a first carcass ply formed of an array of carcass cords and having:
a main body portion extending from the tread portion to a bead core of the bead portion via the sidewall portion; and
a folded-back portion continuous with the main body portion and folded back around the bead core from an inner side toward an outer side in the tire axial direction, and,
in the vulcanization process, the carcass cords of the folded-back portion are inclined at an angle larger than that of the carcass cords of the main body portion with respect to a tire circumferential direction.

4. The method of manufacturing a motorcycle tire for uneven terrain travel according to claim 1, wherein
the green tire includes a carcass extending from the tread portion to the bead portion via the sidewall portion,
the carcass includes a first carcass ply formed of an array of carcass cords and having:
a main body portion extending from the tread portion to a bead core of the bead portion via the sidewall portion; and
a folded-back portion continuous with the main body portion and folded back around the bead core from an inner side toward an outer side in the tire axial direction, and,
in the vulcanization process, the carcass cords of the folded-back portion are inclined at an angle larger than that of the carcass cords of the main body portion with respect to a tire circumferential direction.

5. The method of manufacturing a motorcycle tire for uneven terrain travel according to claim 4, wherein, in the vulcanization process, the carcass cords of the main body portion are inclined at an angle of 27° to 45° with respect to the tire circumferential direction.

6. The method of manufacturing a motorcycle tire for uneven terrain travel according to claim 5, wherein, in the vulcanization process, the carcass cords of the folded-back portion are inclined at an angle of 41° to 50° with respect to the tire circumferential direction.

7. The method of manufacturing a motorcycle tire for uneven terrain travel according to claim 5, wherein
the carcass includes a second carcass ply formed of an array of carcass cords arranged on an outer side in a tire radial direction of the main body portion, and,
in the vulcanization process, a ratio $\theta1/\theta2$ of an angle $\theta1$ of the carcass cords of the main body portion with respect to the tire circumferential direction to an angle $\theta2$ of the carcass cords of the second carcass ply with respect to the tire circumferential direction is set to 1.05 to 1.15.

8. The method of manufacturing a motorcycle tire for uneven terrain travel according to claim 5, wherein
the tread portion includes:
a crown region which is a region of ⅓ of a tread planar width centered on a tire equator; and
a plurality of crown blocks arranged in the crown region, and,
in the vulcanization process, a sum of lengths of each of the crown blocks in the tire circumferential direction is 0.20 to 0.30 times a tire outer circumferential length at the tire equator.

9. The method of manufacturing a motorcycle tire for uneven terrain travel according to claim 4, wherein, in the vulcanization process, the carcass cords of the folded-back portion are inclined at an angle of 41° to 50° with respect to the tire circumferential direction.

10. The method of manufacturing a motorcycle tire for uneven terrain travel according to claim 9, wherein
the carcass includes a second carcass ply formed of an array of carcass cords arranged on an outer side in a tire radial direction of the main body portion, and,
in the vulcanization process, a ratio $\theta1/\theta2$ of an angle $\theta1$ of the carcass cords of the main body portion with respect to the tire circumferential direction to an angle $\theta2$ of the carcass cords of the second carcass ply with respect to the tire circumferential direction is set to 1.05 to 1.15.

11. The method of manufacturing a motorcycle tire for uneven terrain travel according to claim 9, wherein
the tread portion includes:
a crown region which is a region of ⅓ of a tread planar width centered on a tire equator; and
a plurality of crown blocks arranged in the crown region, and,
in the vulcanization process, a sum of lengths of each of the crown blocks in the tire circumferential direction is 0.20 to 0.30 times a tire outer circumferential length at the tire equator.

12. The method of manufacturing a motorcycle tire for uneven terrain travel according to claim 4, wherein
the carcass includes a second carcass ply formed of an array of carcass cords arranged on an outer side in a tire radial direction of the main body portion, and,
in the vulcanization process, a ratio $\theta1/\theta2$ of an angle $\theta1$ of the carcass cords of the main body portion with respect to the tire circumferential direction to an angle $\theta2$ of the carcass cords of the second carcass ply with respect to the tire circumferential direction is set to 1.05 to 1.15.

13. The method of manufacturing a motorcycle tire for uneven terrain travel according to claim 12, wherein
the tread portion includes:
a crown region which is a region of ⅓ of a tread planar width centered on a tire equator; and
a plurality of crown blocks arranged in the crown region, and,
in the vulcanization process, a sum of lengths of each of the crown blocks in the tire circumferential direction is 0.20 to 0.30 times a tire outer circumferential length at the tire equator.

14. The method of manufacturing a motorcycle tire for uneven terrain travel according to claim 4, wherein
the tread portion includes:
a crown region which is a region of ⅓ of a tread planar width centered on a tire equator; and
a plurality of crown blocks arranged in the crown region, and,
in the vulcanization process, a sum of lengths of each of the crown blocks in the tire circumferential direction is 0.20 to 0.30 times a tire outer circumferential length at the tire equator.

15. The method of manufacturing a motorcycle tire for uneven terrain travel according to claim 14, wherein a length in the tire circumferential direction of the crown block is 0.40 to 0.60 times a length in the tire axial direction of the crown block.

16. The method of manufacturing a motorcycle tire for uneven terrain travel according to claim 2, wherein, in the mold, a width in the tire axial direction of the tread molding surface which molds the tread portion is 100% to 110% of a tread width in a normal state in which a completed motorcycle tire is rim-assembled onto the normal rim, filled to a normal internal pressure, and has no load thereon.

17. The method of manufacturing a motorcycle tire for uneven terrain travel according to claim 16, wherein
    the green tire includes a carcass extending from the tread portion to the bead portion via the sidewall portion,
    the carcass includes a first carcass ply formed of an array of carcass cords and having:
    a main body portion extending from the tread portion to a bead core of the bead portion via the sidewall portion; and
    a folded-back portion continuous with the main body portion and folded back around the bead core from an inner side toward an outer side in the tire axial direction, and,
    in the vulcanization process, the carcass cords of the folded-back portion are inclined at an angle larger than that of the carcass cords of the main body portion with respect to a tire circumferential direction.

18. The method of manufacturing a motorcycle tire for uneven terrain travel according to claim 2, wherein
    the green tire includes a carcass extending from the tread portion to the bead portion via the sidewall portion,
    the carcass includes a first carcass ply formed of an array of carcass cords and having:
    a main body portion extending from the tread portion to a bead core of the bead portion via the sidewall portion; and
    a folded-back portion continuous with the main body portion and folded back around the bead core from an inner side toward an outer side in the tire axial direction, and,
    in the vulcanization process, the carcass cords of the folded-back portion are inclined at an angle larger than that of the carcass cords of the main body portion with respect to a tire circumferential direction.

19. The method of manufacturing a motorcycle tire for uneven terrain travel according to claim 18, wherein, in the vulcanization process, the carcass cords of the main body portion are inclined at an angle of 27° to 45° with respect to the tire circumferential direction.

* * * * *